Figure 1:
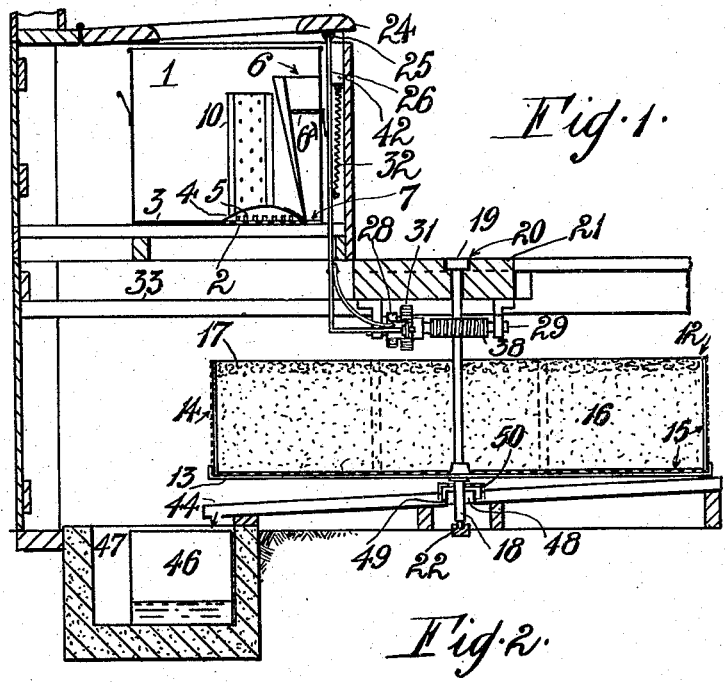

E. L. SHORT.
NIDUS FOR AEROBIC BACTERIA, APPLICABLE TO CLOSETS AND URINALS.
APPLICATION FILED JAN. 21, 1908.

930,319.

Patented Aug. 3, 1909.

2 SHEETS—SHEET 1.

Witnesses
William G. Holden
William T. Harris

Inventor
Edgar Lawry Short.

By
Edw<sup>d</sup> Waters & Sons
Attorneys

E. L. SHORT.
NIDUS FOR AEROBIC BACTERIA, APPLICABLE TO CLOSETS AND URINALS.
APPLICATION FILED JAN. 21, 1908.
930,319.
Patented Aug. 3, 1909.
2 SHEETS—SHEET 2.
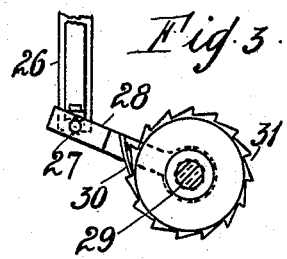
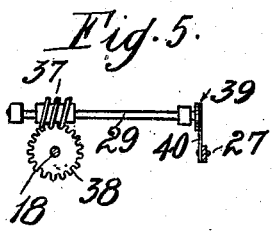
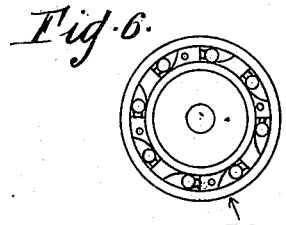
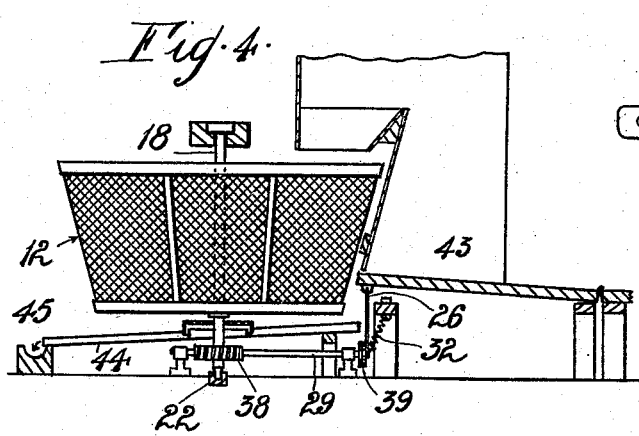
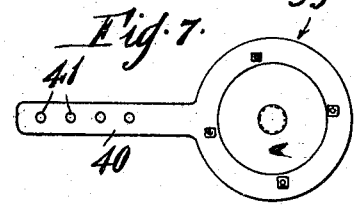
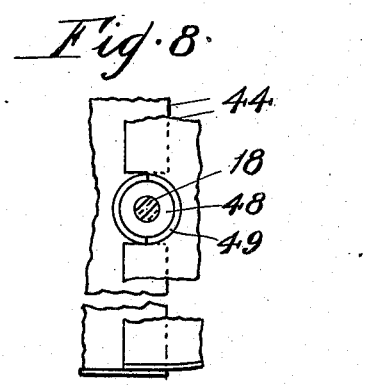
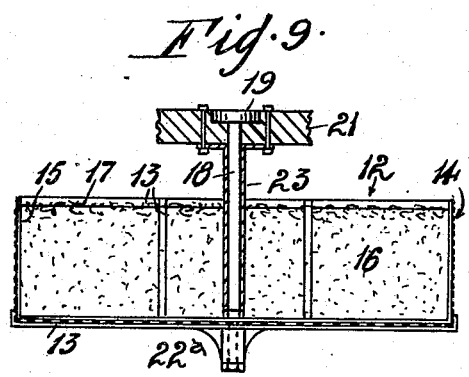
Witnesses
William G. Holden
William J. Harris
Inventor
Edgar Lawry Short
By
Edw<sup>d</sup> Waters & Sons
Attorneys

UNITED STATES PATENT OFFICE.

EDGAR LAWRY SHORT, OF MILDURA, VICTORIA, AUSTRALIA, ASSIGNOR OF ONE-FIFTH TO ALFRED PICKFORD, OF MILDURA, VICTORIA, AUSTRALIA.

NIDUS FOR AEROBIC BACTERIA APPLICABLE TO CLOSETS AND URINALS.

No. 930,319.     Specification of Letters Patent.     Patented Aug. 3, 1909.

Application filed January 21, 1908. Serial No. 411,905.

*To all whom it may concern:*

Be it known that I, EDGAR LAWRY SHORT, a subject of the King of Great Britain, residing at Ettiwanda avenue, Mildura, in the State of Victoria, Australia, fruit-grower, have invented Improvements in Nidus for Aerobic Bacteria Applicable to Closets and Urinals, of which the following is a specification.

With closets and urinals the offensiveness of urine depends upon the treatment it receives, and this invention consists of a nidus for aerobic bacteria which provides those conditions which are favorable to the bacteriological processes by means of which the urea contained in urine is changed into inoffensive substances.

The nidus consists of a quantity of absorbent material which is favorable to the growth of air-borne bacteria (such as the saw-dust of Australian red-gum timber) contained in a porous frame-work or receptacle. Its chief characteristics are absorptiveness and porosity, consequently air will penetrate to its interior as easily as water does, and the air-borne bacteria which assist in breaking up organic matter into inorganic substances will be enabled to perform their functions in the nidus.

The urine having been separated from the solid matter when necessary by suitable means falls on and is absorbed by the nidus. The urea molecules are broken up by the air-borne bacteria, the mere water is disposed of partly by drainage and partly by evaporation from the surfaces of the nidus accordingly as the surrounding air is dry or charged with moisture, that which drains through the nidus is harmless and may be drained away by suitable means, or thrown away.

In order to prevent the liquid from falling on to the nidus on the same place every time it is used and in order to insure periodical rest and reaeration throughout the nidus which is necessary for the continued action of the aerobic bacteria, the nidus is rotatably mounted and furthermore provided with suitable mechanism which causes it to revolve intermittently and automatically by the weight of the person using the closet or urinals. Where the use of closets is not great, the automatic mechanism may be dispensed with.

Figure 2:
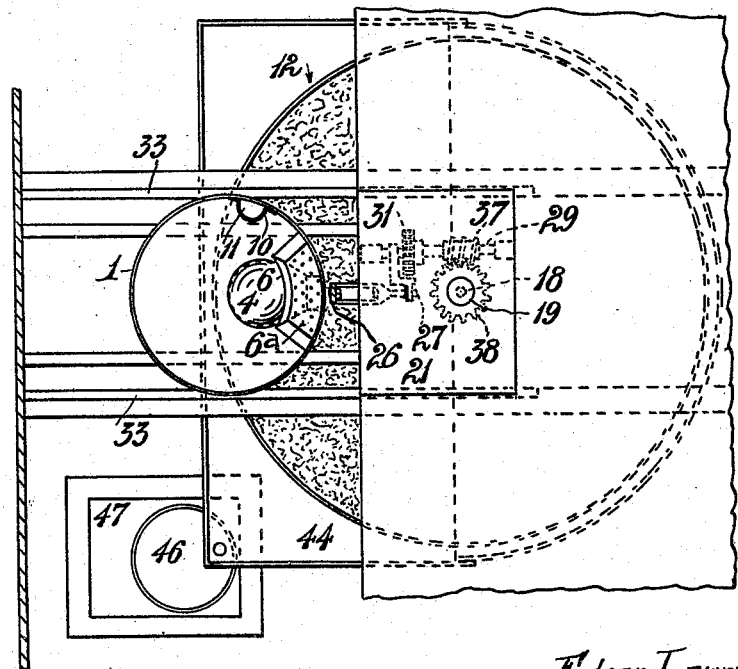

The drawings illustrating the invention comprise;—Figure 1 a vertical section through a pan closet illustrating the application of the nidus thereto. Fig. 2 a plan view thereof (broken) with the seat removed, and Fig. 3 is an enlarged detail view illustrating a ratchet transmission means which is employed to rotate the nidus bed in a step-by-step manner. Fig. 4 a vertical section (partly in elevation) showing the application of the nidus to the urinal, and Fig. 5 a plan of the gear thereof. Figs. 6 and 7 an inside and an outside elevation of the respective halves of one suitable form of clutch employed. Fig. 8 a detail (broken) showing the drainage tray formed in two pieces. Fig. 9 a vertical section of the nidus showing one form of its construction.

According to this invention as appertaining to pan closets it is necessary to provide means for draining away the liquid only and one suitable arrangement is shown in Figs. 1 and 2 for the purpose. The pan 1 is provided with perforations 2 in the bottom 3, covered by a hinged convex false bottom or strainer 4 having a serrated edge 5 to facilitate the exit of the liquid and prevent the passage of the solid matter. Inside the pan and at the front thereof is a vertical funnel 6 provided with a strainer 6ª near the upper end and connected at the bottom with a hole 7 in the bottom of said pan. The liquid is drained through the pan principally by means of this funnel and that which passes into the pan is drained away through the perforations 2 in the bottom thereof. In case said perforations become choked, a shaft 10 is provided on the inside of pan having perforations in the side, and is closed at the top and open at the bottom where it communicates with an opening 11 through the bottom of the pan. The drainage from the pan accomplished by the perforations 2 in the bottom thereof, the funnel 6 and shaft 10, is preferably arranged in the front half of the pan as illustrated in the drawings, so that the liquid is discharged in the rear end of the aerobic bacterial nidus 12 situate beneath. Said nidus comprises a foraminous vessel or receptacle which is preferably circular, and its frame 13 may be constructed in any desired manner and of any suitable material, as for instance in Fig. 9 where it is shown framed of light iron bars and the side and bottom are detachable from the base. The frame is covered externally on its side and bottom preferably by wire netting or other form of wire work 14, and the whole subsequently tarred, while it is furthermore lined internally with canvas 15 or like material of open texture and filled with damped saw-dust or like absorbent substance 16, which is topped with cinders or charcoal 17. The nidus is provided with a central vertical spindle 18, which is suspended from overhead bearings, and journaled also at its lower end in a suitable bearing. With this construction the spindle 18 is provided at the top with a circular head 19 journaled in a bearing 20, formed in a bed plate or bearer 21, while its lower end is journaled in a footstep bearing 22 situate about the ground level, or in an internal bearing 22ª formed at the lower end of a pipe 23 projecting downwardly from the bearer 21 as in Fig. 9. The bed-plate or bearer is preferably mounted on slides 33 to facilitate the removal of the nidus.

In order to insure that the liquid will be distributed evenly over the whole surface of the aerobic bacterial medium, the nidus is regularly partially revolved each time the closet is used. To this end automatic mechanism is provided, which is set in motion by the weight of the person using the closet or urinal through the medium of a spring controlled hinged element, which latter may consist in the case of a closet of the seat, and in the case of the urinal a hinged portion of the floor or a platform is utilized. The intermediary gear for imparting motion from the hinged element to the spindle of the nidus consists of any suitable device that will impart intermittent rotary motion in one direction only such for instance as a ratchet device or a clutch. In the case of the closet, the seat 24 is used as the hinged element and it is hinged at the rear and provided at its front and on the underside with an eyelet 25 to which is hooked the upper end of a vertical bar 26 preferably formed with an L-shaped foot. Where a ratchet is used as shown in Figs. 1, 2, and 3, the lower end of the bar 26 is removably connected by a pin 27 to a radial arm 28 loosely mounted on a horizontal shaft 29, which latter is journaled in bearings projecting from the bearer 21. Said arm carries a spring pawl 30 adapted to engage with a ratchet wheel 31 secured to the shaft 29 and upon the latter is mounted a worm 37 geared with a worm wheel 38 on the spindle of the nidus. It will be obvious that a clutch 39 may be substituted for the ratchet device in which case the bar 26 would be connected directly with the arm 40 of said clutch (Figs. 4, 5, 6 and 7). The clutch may be one of the well known kinds used on free wheel cycles which is made in two parts (Figs. 6 and 7), and operates only when its arm 40 is depressed, and said arm is provided with holes 41, into any of which the pin 27 connecting it to the vertical bar 26 may be placed in order to adjust the stroke. The seat 24 is normally maintained in its raised position by a spring 32 attached at its respective ends to the vertical bar 26 (or the arm of clutch) and the frame 42 of the closet.

With the foregoing mechanism, the weight of a person's body when being seated on the closet depresses the seat and through the bar 26 operates the ratchet device and rotates the worm 37 and worm wheel 38, thus partially revolving the nidus and presenting a fresh surface for the liquid. With urinals as in Fig. 4, there being no solid matter to deal with, the liquid is discharged directly into the nidus 12.

Where the urinal nidus is automatically revoluble the gear is situate below the filter and the hinged element consists preferably of a hinged platform 43, situate about the level of the floor, which is connected by the bar 26 with the arm of clutch 39 (or ratchet device). It will be apparent the platform will be depressed by the weight of the user and so partially rotate the nidus each time the urinal is used.

The liquid which passes through the nidus is caught in a shallow tray 44 beneath, said tray being inclined and adapted to discharge into a gutter 45, Fig. 4 or into a bucket 46— Figs. 1 and 2 placed in a pit 47 for the purpose.

The spindle 18 of the nidus may pass through a hole 48 in the drainage tray, and around said hole is formed a vertical rim 49 which may be covered by a convex plate 50 on said spindle in order to prevent liquid escaping from the drainage tray. With this construction the latter is preferably made in two pieces to facilitate removal, the line of division passing through the hole 48 and one of said pieces overlaps the other as shown in Fig. 8.

With regard to the bacterial medium, it is to be clearly understood that I do not bind myself to the substances mentioned, but it is essential that the bacterial medium must be such as is favorable to aerobic, i. e. air-borne bacterial growths.

Having now particularly described and ascertained the nature of my said invention and in what manner the same is to be performed, I declare that what I claim is:—

1. Improvements in or relating to a nidus applicable to closets and urinals comprising a revolubly mounted foraminous vessel filled with an absorbent medium favorable to aerobic bacterial growths and adapted to receive the liquid only substantially as and for the purpose set forth.

2. Improvements in or relating to a nidus applicable to closets and urinals comprising an automatic revolubly mounted foraminous vessel filled with an absorbent medium favorable to aerobic bacterial growths and adapted to receive the liquid only substantially as and for the purpose set forth.

3. A revoluble nidus for aerobic bacteria filled with an absorbent medium favorable to aerobic bacterial growths provided with a central vertical spindle, a circular head on the upper end thereof journaled in a bearing in an overhead bearer, and a bearing for the lower end of said spindle substantially as and for the purpose set forth.

4. A revoluble nidus for aerobic bacteria filled with an absorbent medium favorable to aerobic bacterial growths having in combination therewith automatic revoluble means comprising a spring supported hinged element adapted to be depressed by the weight of a person and connected with revoluble gear for transmitting intermittent rotary motion to the spindle of said nidus substantially as and for the purpose set forth.

5. In a revoluble nidus of the type set forth, in combination, means for automatically revolving the nidus comprising a centrally located spindle associated therewith, a worm wheel on said spindle, a transmission shaft, a worm on said shaft in gear with said worm wheel, a spring supported hinged element and ratchet connecting means between said hinged element and said transmission shaft.

6. In a revoluble nidus of the type set forth, in combination, a foraminous vessel mounted for rotation, mechanism for rotating said vessel, a hinged closet seat, a bar depending from said seat and forming a part of said mechanism, and a spring connected to said bar and to a stationary part, said spring returning said bar to initial position after each operation thereof.

7. A revoluble nidus for aerobic bacteria in combination with a closet pan situate above same and provided with a perforated bottom, an internal funnel on the interior of the front side of said pan provided with a strainer to receive liquid only and an inclined drainage tray beneath said nidus substantially as and for the purpose set forth.

8. The combination with a revoluble nidus and its spindle, of a drainage tray formed in two overlapping pieces and having a center hole with a projecting rim through which the spindle of the nidus passes, and a convex plate on said spindle substantially as and for the purpose set forth.

9. In a revoluble nidus, a container having a base, a supporting bar, a tube depending from said bar, an internal bearing associated with said bar, and a spindle depending from said bar through said tube and connected to said base, said spindle being journaled in said tube and bearing.

10. In an apparatus of the type set forth, in combination, a revolubly mounted container, a spring supported element arranged to be depressed by the weight of a person resting thereon, and gearing between said element and said container for partially rotating the latter upon each depression of said element.

11. In an apparatus of the type set forth, in combination, a rotatable container, gearing for rotating said container including a shaft rotated in a step by step manner, a depressible operating element, a rod associated and movable therewith, a ratchet element for rotating said shaft, a connection between said rod and said ratchet element for operating the latter upon each depression of said operating element, and spring means for returning said operating element to normal position.

12. In an apparatus of the type set forth, a revolubly mounted container, means for rotating said container in a step by step manner and a closet stand constructed to discharge its liquid contents upon the contents of said container at a fixed point in its rotation.

13. In an apparatus of the type set forth, in combination, a revolubly mounted container, means for rotating said container in a step by step manner, a closet stand constructed to discharge its liquid contents upon the contents of said container at a fixed point in its rotation, a spring supported element, depressible under the weight of a person resting thereon and operative connections between said element and said means.

14. In an apparatus of the type set forth, in combination, a spider frame and a vessel seated thereon and constructed with a foraminous bottom and sides, said vessel containing absorbent material.

15. In an apparatus of the type set forth, in combination, a spider frame, a vessel seated thereon and having a foraminous bottom and sides, and a canvas lining for the interior of the vessel.

16. In an apparatus of the type set forth, a depressible operating element, a nidus including a medium favorable to aerobic bacterial growths, a closet pan, and means operated by said element when depressed for causing the discharges of the liquid contents of the closet pan upon successive portions of the surface of said medium.

17. In an apparatus of the type set forth, in combination, a depressible operating element, a rotatably mounted nidus including a medium favorable to aerobic bacterial growths, a closet pan, and means operated by said element when depressed for causing successive partial rotations of the nidus in the same direction.

18. In an apparatus of the type set forth, in combination, a closet pan, a nidus for aerobic bacteria disposed below said pan, an operating element and means set in motion by said operating element for causing relative partial rotation between said pan and said nidus whereby the former discharges its contents upon the nidus at successively located points.

19. In an apparatus of the type set forth, in combination, a revolubly mounted foraminous vessel, means for rotating said vessel in a step by step manner, and a closet pan constructed to discharge its liquid contents upon the contents of said vessel at a fixed point in its rotation.

20. A nidus for aerobic bacteria comprising a foraminous vessel filled with an absorbent medium favorable to aerobic bacterial growth.

21. A nidus for aerobic bacteria comprising a foraminous vessel filled with sawdust favorable to aerobic bacterial growth.

In testimony whereof I have hereunto set my hand in presence of two subscribing witnesses.

EDGAR LAWRY SHORT.

Witnesses:
EDWARD NEEDHAM WATERS,
WILLIAM HERBERT WATERS.